(12) United States Patent
Mazzini et al.

(10) Patent No.: US 11,659,953 B2
(45) Date of Patent: May 30, 2023

(54) BEAN TO CUP POSITIVE PRESSURE BREWER

(71) Applicant: BUNN-O-MATIC CORPORATION, Springfield, IL (US)

(72) Inventors: Scott A. Mazzini, Springfield, IL (US); John D. Bishop, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 839 days.

(21) Appl. No.: 16/465,187

(22) PCT Filed: Dec. 13, 2017

(86) PCT No.: PCT/US2017/065971
§ 371 (c)(1),
(2) Date: May 30, 2019

(87) PCT Pub. No.: WO2018/111972
PCT Pub. Date: Jun. 21, 2018

(65) Prior Publication Data
US 2019/0365139 A1    Dec. 5, 2019

Related U.S. Application Data

(60) Provisional application No. 62/433,603, filed on Dec. 13, 2016.

(51) Int. Cl.
*A47J 31/36* (2006.01)
*A47J 31/52* (2006.01)
*A23F 5/26* (2006.01)

(52) U.S. Cl.
CPC ............. *A47J 31/3652* (2013.01); *A23F 5/26* (2013.01); *A47J 31/5251* (2018.08)

(58) Field of Classification Search
CPC ...... A47J 31/3652; A47J 31/5251; A23F 5/26
See application file for complete search history.

(56) References Cited

U.S. PATENT DOCUMENTS

| | | | |
|---|---|---|---|
| 3,046,869 A | 7/1962 | Reynolds | |
| 3,356,011 A | 12/1967 | Parraga | |
| 3,565,641 A * | 2/1971 | King | A47J 31/36 99/287 |
| 3,662,675 A * | 5/1972 | Olland | A47J 31/408 99/289 R |
| 4,506,596 A | 3/1985 | Shigenobu et al. | |
| 4,757,752 A | 7/1988 | Robins et al. | |
| 4,903,586 A | 2/1990 | King | |

(Continued)

FOREIGN PATENT DOCUMENTS

WO    1988/002612    4/1988

OTHER PUBLICATIONS

Search Report & Written Opinion issued in Int'l. App. No. PCT/US2017/065971 (2018).

*Primary Examiner* — Anthony J Weier
(74) *Attorney, Agent, or Firm* — Barnes & Thornburg LLP

(57) ABSTRACT

A brewer system includes a storage tank, a brew chamber movable relative to the storage tank and positioned over a mouth of the storage tank, and a filter tape positioned between the chamber and the storage tank. Brewing substance and water are added to the chamber to form a brewed beverage. The brewed beverage passes through the filter tape and into the storage tank through the mouth.

8 Claims, 6 Drawing Sheets

(56) References Cited

U.S. PATENT DOCUMENTS

| | | | |
|---|---|---|---|
| 4,967,647 A | 11/1990 | King | |
| 5,127,317 A * | 7/1992 | Takayanagi | A47J 31/32 |
| | | | 99/302 R |
| 5,197,373 A | 3/1993 | De Jong | |
| 5,297,472 A | 3/1994 | Suzuki et al. | |
| 5,337,653 A * | 8/1994 | Sellers | A47J 31/408 |
| | | | 99/287 |
| 5,393,540 A | 2/1995 | Bunn et al. | |
| 5,697,288 A | 12/1997 | King | |
| 5,878,653 A | 3/1999 | Verhoef | |
| 6,041,693 A | 3/2000 | Fukushima | |
| 6,279,461 B1 | 8/2001 | Fukushima et al. | |
| 6,401,597 B1 | 6/2002 | Stettes et al. | |
| 7,448,314 B2 | 11/2008 | Ioannone et al. | |
| 7,581,489 B2 | 9/2009 | Van Hattem et al. | |
| 7,726,233 B2 | 6/2010 | Kodden et al. | |
| 7,858,135 B2 | 12/2010 | Radosav | |
| 8,286,547 B1 | 10/2012 | Lassota | |
| 8,850,958 B2 | 10/2014 | McCormick et al. | |
| 8,950,318 B2 | 2/2015 | Ford | |
| 10,779,675 B2 * | 9/2020 | Ford | A47J 31/06 |
| 2011/0039009 A1 | 2/2011 | Jones et al. | |
| 2012/0100275 A1 | 4/2012 | Bishop et al. | |
| 2013/0156899 A1 | 6/2013 | Quinn et al. | |
| 2013/0344205 A1 | 12/2013 | Oh | |
| 2014/0170280 A1 | 6/2014 | St. Germain et al. | |
| 2016/0058241 A1 * | 3/2016 | Tsutsumi | A47J 31/5251 |
| | | | 99/283 |
| 2017/0055759 A1 | 3/2017 | Radosav | |

* cited by examiner

BEAN TO CUP POSITIVE PRESSURE BREWER

CROSS REFERENCE TO RELATED APPLICATIONS

This application is a U.S. nationalization under 35 U.S.C. § 371 of International Application No. PCT/US2017/065971, filed Dec. 13, 2017, which claims priority under 35 U.S.C. § 119(e) to U.S. Provisional Application Ser. No. 62/433,603, filed Dec. 13, 2016. The disclosures set forth in the referenced applications are incorporated herein by reference in their entireties.

BACKGROUND

The present disclosure relates to beverage brewers, and particularly to automated beverage brewers. More particularly, the present disclosure relates to an automated beverage brewing system for forming a brewed beverage from a brewing substance at the selection of a user.

SUMMARY

According to the present disclosure, a brewer system includes a storage tank, a brew chamber movable relative to the storage tank and positioned over a mouth of the storage tank, and a filter tape positioned between the chamber and the storage tank. Brewing substance and water are added to the chamber to form a brewed beverage that passes through the filter tape and into the storage tank through the mouth.

In illustrative embodiments, a pressure control system is coupled to the brew chamber to adjust a pressure within the brew chamber during a brew cycle of the brewer system. The pressure control system includes a pressure source and a controllable valve. The pressure control system controllably pressurizes the brew chamber to drive the brewed beverage through the brewing substance and filter tape into the storage tank.

In illustrative embodiments, the pressure source is coupled to the storage tank. The pressure control system controllably pressurizes the storage tank during the brew cycle to drive gas through the mouth into the chamber to agitate the brewing substance and water. Pressure in the storage tank is vented and the brewed beverage passes through the mouth into the storage tank.

In illustrative embodiments, the brew chamber includes a chamber body and a closure member coupled to the body for rotation relative to the body. The closure member and chamber body are each formed to include apertures that align with one another to allow water and brewing substance to be deposited into the brew chamber. The closure member rotates relative to the chamber body to misalign the apertures and seal the brew chamber for pressurization.

In illustrative embodiments, a carriage of the brewer system includes the brew chamber and a closure driver coupled to the brew chamber. The closure driver controllably rotates the closure member of the brew chamber. A carriage driver controllably moves the carriage relative to the storage tank.

BRIEF DESCRIPTION OF THE DRAWINGS

The present disclosure will be described hereafter with reference to the attached drawings which are given as a non-limiting example only, in which.

Figure 1:
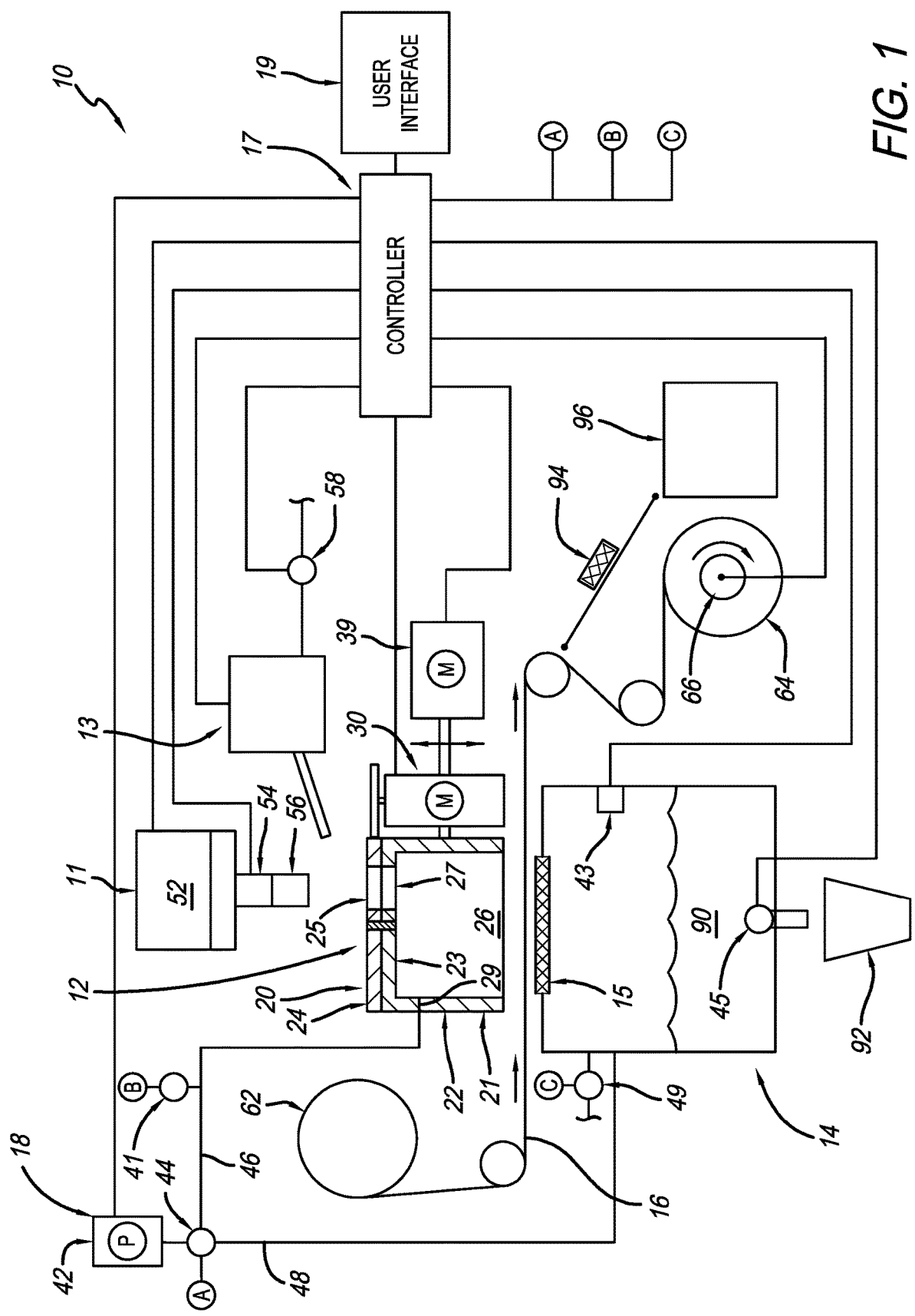
FIG. 1 is a diagrammatic view of a brewer system in accordance with the present disclosure showing that the brewer system includes a storage tank, a carriage positioned above the storage tank for movement relative thereto, a filter tape positioned between a brew chamber of the carriage and the storage tank, a brewing substance delivery system for delivering brewing substance to the brew chamber, a water delivery system for delivering water to the chamber, a controller coupled to the various components in the brewer system, and a pressure control system including a pressure source and a controllable valve.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a brewing substance with a liquid such as water without limitation to the temperature of such liquid unless specified. This broad interpretation is also intended to include, but is not limited to, brewing substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product. Beverage brewing substances will be described in the present application and generally will be referred to as "coffee". However, it should be understood that the term brewing substance should be broadly interpreted regardless of reference to brewing substance or coffee.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

One embodiment of a brewer system 10 in accordance with the present disclosure is shown in FIG. 1. Brewer system 10 includes a carriage 12, a storage tank 14, and a filter tape 16 positioned between carriage 12 and storage tank 14. Carriage 12 is movable relative to storage tank 14 to trap filter tape 16, such as a porous fabric or paper tape, between to storage tank 14 and a brew chamber 20 of carriage 12. A brewing substance delivery system 11 and a water delivery system 13 are configured to dispense brewing substance and water, respectively, into brew chamber 20 during a brew cycle of brewer system 10 to form a brewed beverage. The brewed beverage passes from brew chamber 20 into storage tank 14 through a mouth 15 of storage tank 14 having a generally permanent retaining filter element to provide structural support underneath filter tape 16. A pressure control system 18 is configured to controllably pressurize at least one of brew chamber 20 and storage tank 14 in order to accelerate the brew process of brewer system 10. A controller 17 automates operation of brewer system 10 based on selections made by a user through a user interface 19.

Carriage 12 includes brew chamber 20 and a closure driver 30, and a carriage driver 39 is configured to controllably move carriage 12 relative to storage tank 14 (such as upwardly and downwardly) as shown in FIG. 1. Brew chamber 20 includes a chamber body 22 and a closure member 24 coupled to chamber body 22 for rotation relative thereto. Chamber body 22 includes a sidewall 21 and lid 23 defining an interior region 26 of brew chamber 20. A lower end of chamber body 22 is open and engages with filter tape 16 and storage tank 14 to seal the lower end of brew chamber 20 around mouth 15 during the brew cycle. Lid 23 is formed to include an aperture 27 extending into interior region 26. Closure member 25 is formed to include an aperture 25 that aligns with aperture 27 of chamber body 22 to allow water and brewing substance to enter interior region 26.

Closure driver 30 is coupled to brew chamber 20 for movement therewith as shown in FIG. 1. Closure driver 30 is configured to move closure member 24 relative to chamber body 22 from an opened position, where apertures 25, 27 are aligned, to a closed position, where apertures 25, 27 are misaligned, to seal brew chamber 20 for pressurization by pressure control system 18. In the illustrative embodiment, pressure control system 18 includes a pressure source 42, such as a gas pump or pressurized gas tank, and a controllable valve 44. Valve 44 is configured to controllably distribute pressurized gas from pressure source 42 to brew chamber 20 over line 46 or storage tank 14 over line 48. Line 46 is connected to a pressure port 29 of brew chamber 20. A sensor 41 is configured to measure pressure in brew chamber 20. A controllable vent valve 49 is coupled to storage tank 14 to controllably vent pressure from storage tank 14.

Storage tank 14 is configured to hold a volume of brewed beverage 90 for dispensing into a cup 92 through a dispense valve 45 as shown in FIG. 1. A level sensor 43 coupled to storage tank 14 is configured to sense an overflow condition in order to prevent brewed beverage 90 from passing through vent valve 49 or overfilling storage tank 14 such that brewed beverage flows up and out of mouth 15. In some embodiments, storage tank 14 is sized to hold a single serving of brewed beverage 90. In some embodiments, storage tank 14 is sized to hold multiple servings of brewed beverage 90. In some embodiments, a heater is coupled to storage tank 14 to maintain brewed beverage 90 at a desirable drinking temperature.

Brewing substance delivery system 11 includes a hopper 52 and a delivery chute 56 coupled to hopper 52 as shown in FIG. 1. Hopper 52 is configured to hold brewing substance for controllable dispensing through chute 56 into brew chamber 20. In some embodiments, hopper 52 is configured to hold whole bean coffee, and a grinder 54 coupled to hopper 52 grinds the coffee beans for dispensing through chute 56. In some embodiments, hopper 52 holds ground coffee, for example, and controllably distributes the ground coffee through chute 56.

In the illustrative embodiment, water delivery system 13 is in the form of a holding tank which is controllably filled from an inlet line using a controllable valve 58 as suggested in FIG. 1. Water delivery system 13 can provide water in a range of temperatures depending on the recipe and the substances used for the beverage being made. In some embodiments, water delivery system delivers cold water to brew chamber 20, and a heater is used to heat brew chamber 20 during the brew cycle.

Filter tape 16 extends between a supply roll 62 and a take-up reel 64 as shown in FIG. 1. A motor 66 rotates take-up reel 64 to move filter tape 16 and provide a fresh portion of filter tape 16 from supply roll 62 for use in subsequent brew cycles. Spent brewing substance 94 is moved with filter tape 16 after a completed brew cycle and deposited into a waste bin 96.

Figure 2:
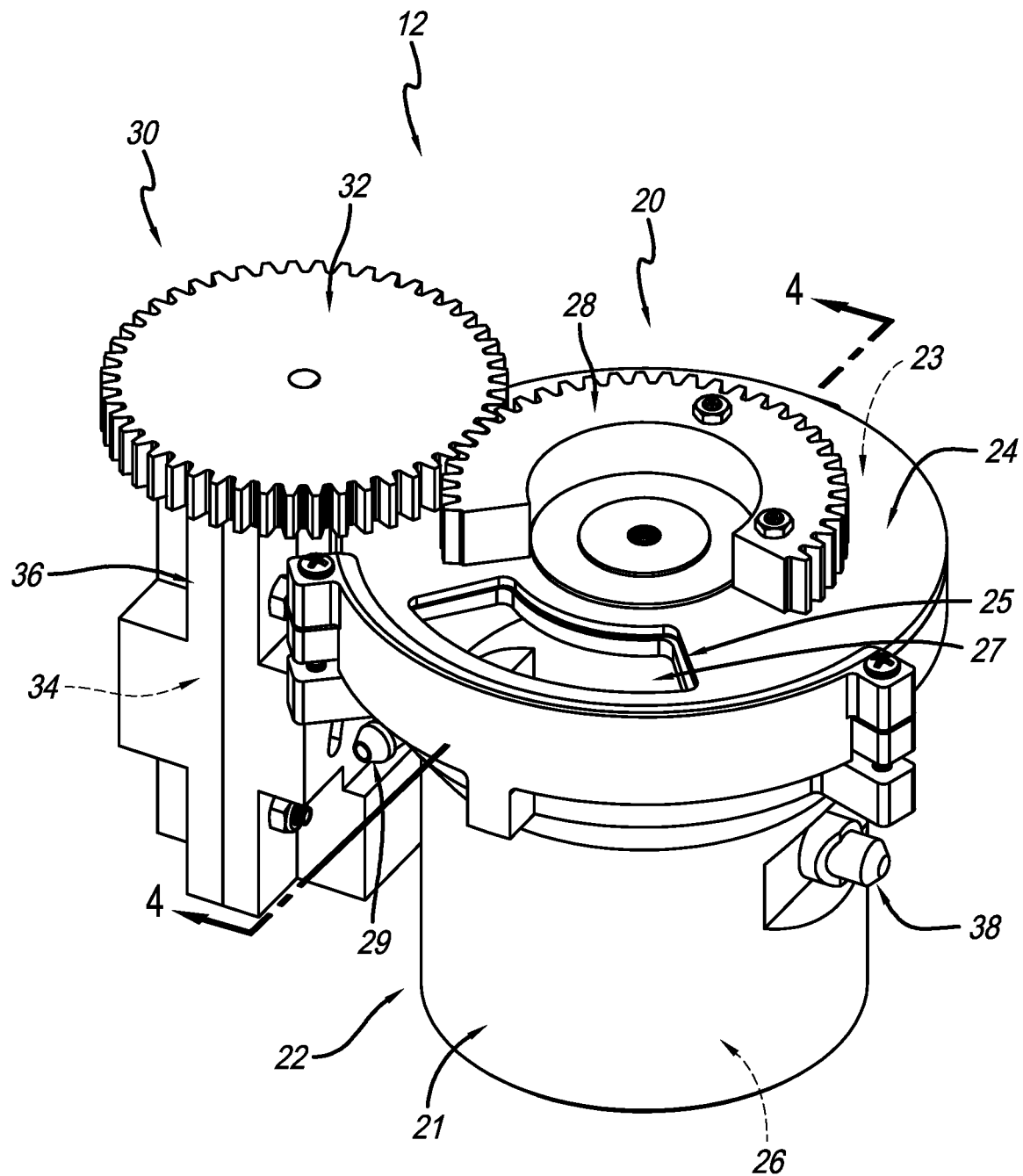
FIG. 2 is an upper perspective view of the carriage of FIG. 1 showing that the carriage includes the brew chamber and a closure driver coupled to the brew chamber for movement therewith.
Figure 3:
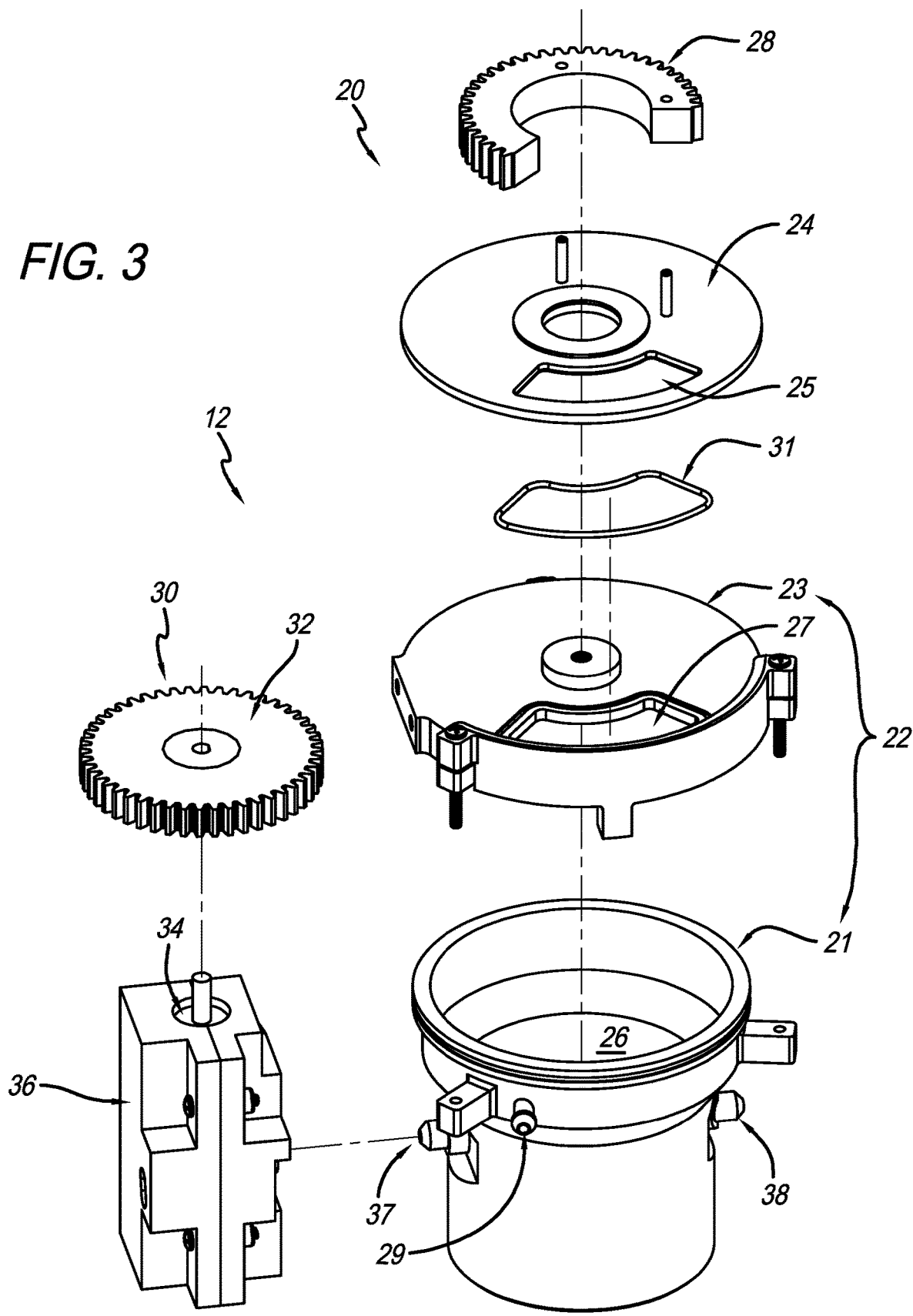
FIG. 3 is an exploded assembly view of the carriage of FIG. 2 showing that the brew chamber includes a body and a closure member and that the closure driver includes a motor and a gear coupled to the motor for engaging with the closure member to drive rotation of the closure member relative to the body of the brew chamber.

One embodiment of a carriage 12 in accordance with the present disclosure for use in brewer system 10 is shown in FIGS. 2 and 3. Carriage 12 includes brew chamber 20 and closure driver 30. Closure driver 30 includes a drive gear 32 and a motor 34 coupled to drive gear 32. A housing 36 encloses motor 34 and attaches to a lug 37 of brew chamber 20 to hold closure driver 30 on brew chamber 20 for movement therewith.

Figure 4:
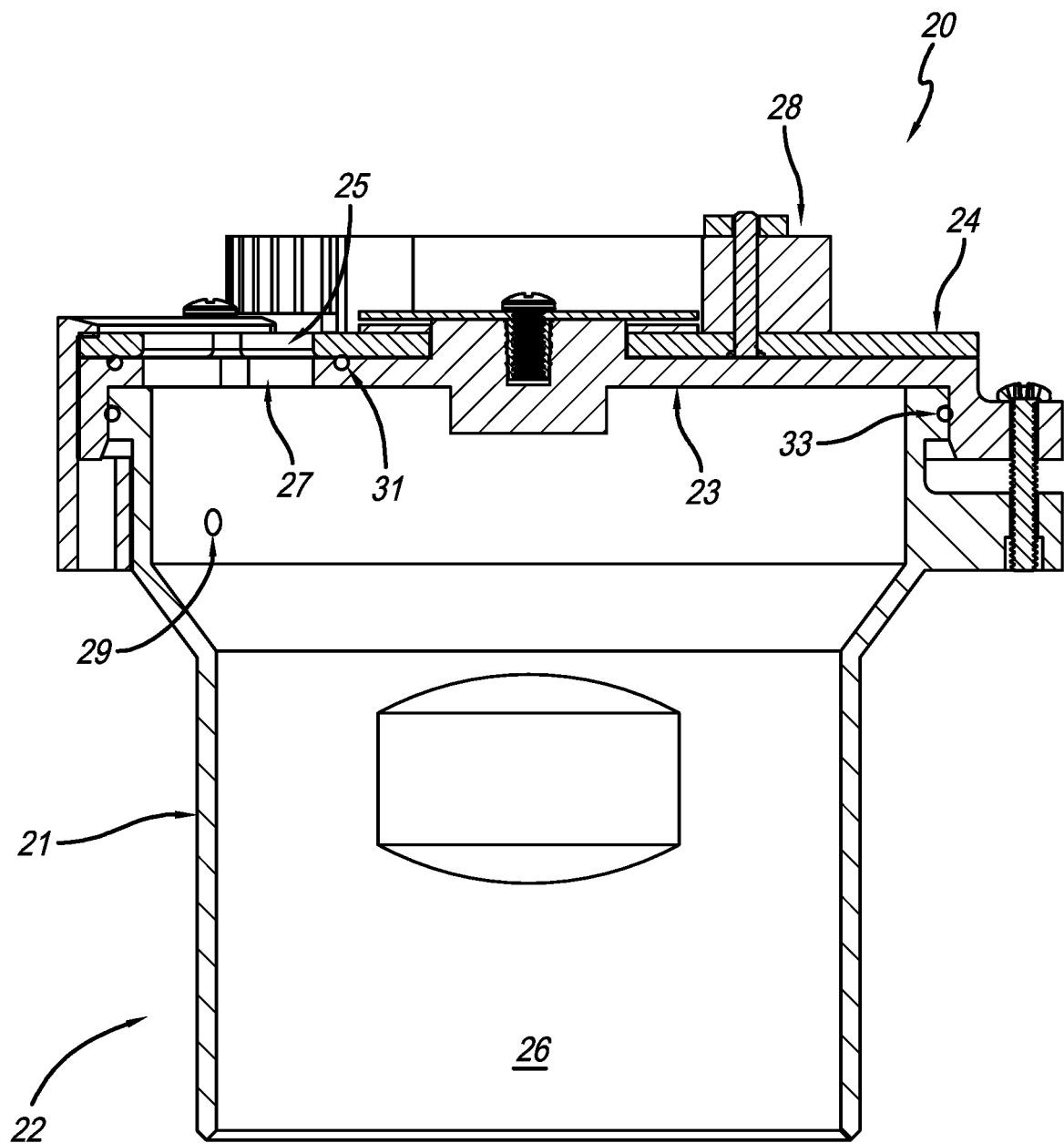
FIG. 4 is a sectional view taken along line 4-4 in FIG. 2 showing that a pressure port extends into the brew chamber to allow the pressure control system to pressurize the brew chamber and that seals are positioned between the closure member and lid and between the lid and sidewall to provide a sealed chamber for pressurization.

Brew chamber 20 includes chamber body 22 and closure member 24 coupled to chamber body 22 for rotation relative thereto as shown in FIGS. 2-4. A pinion gear 28 is coupled to closure member 24 and configured to engage with drive gear 32 of closure driver 30 to rotate closure member 24 with rotation of drive gear 32. Chamber body 22 includes sidewall 21 and lid 23 coupled to sidewall 21. Closure member 24 and lid 23 are formed to include apertures 25, 27, respectively. In the illustrative embodiment, a closure gasket 31 is coupled to lid 23 around aperture 27 and configured to form a seal between lid 23 and closure member 24. A lid gasket 33 is coupled to sidewall 21 around a perimeter thereof and configured to form a seal between sidewall 21 and lid 23. Pressure port 29 extends through sidewall 21 to allow pressure control system 18 to pressurize brew chamber 20.

Figure 5:
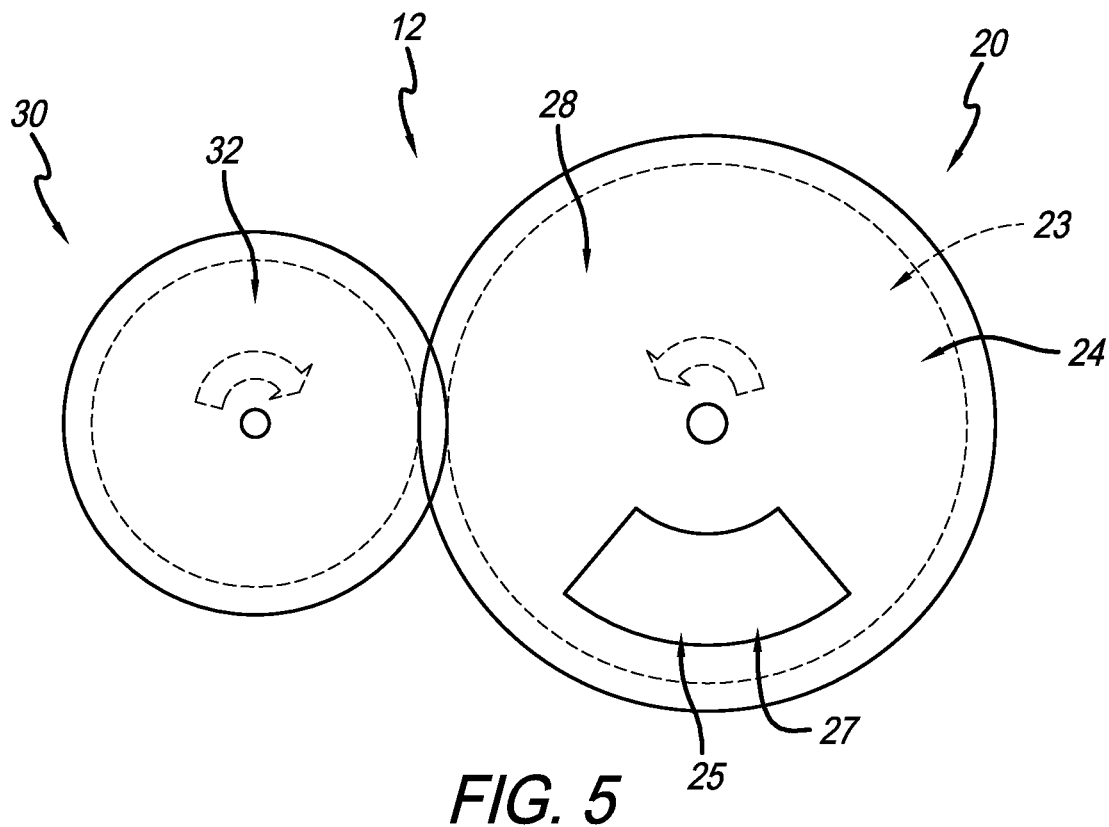
FIG. 5 is a top plan diagrammatic view of the carriage of FIG. 2 showing the apertures of the closure member and chamber body aligned with one another and suggesting that the closure driver moves the closure member from an opened position, shown in FIG. 5, to a closed position where the apertures are misaligned from one another, shown in FIG. 6.
Figure 6:
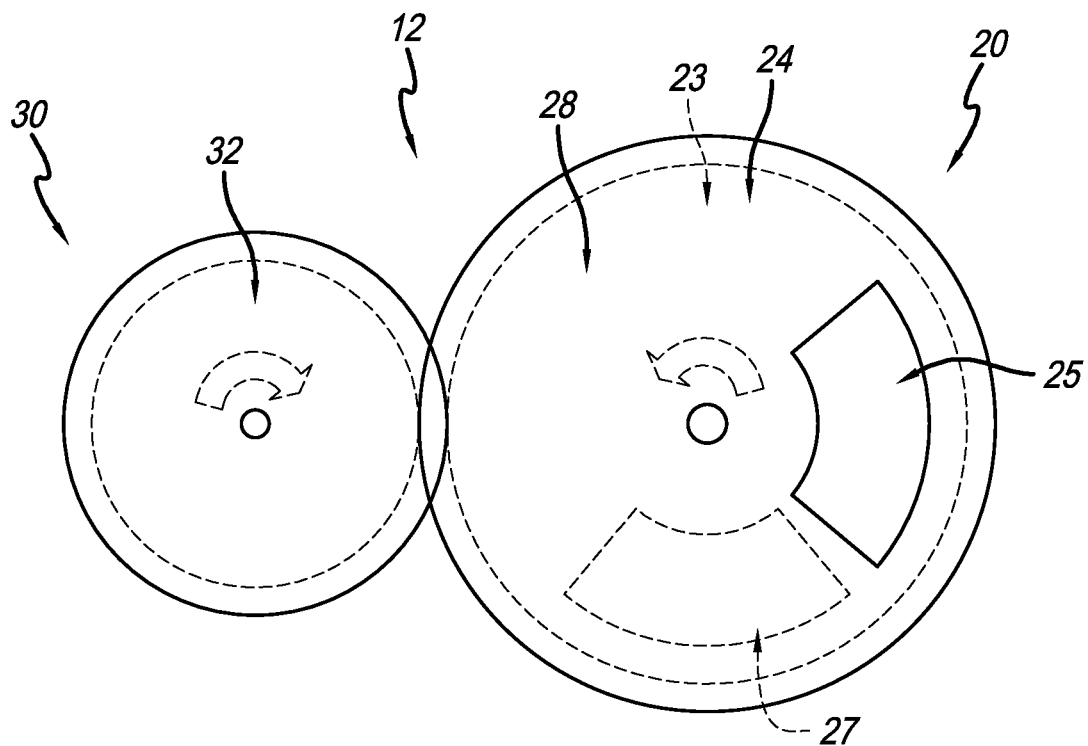
FIG. 6 is a view similar to FIG. 5 showing the closure member moved to the closed position to seal the brew chamber for pressurization.

Closure member 24 is shown in an opened position where apertures 25, 27 are aligned with one another in FIGS. 2 and 5. Closure member 24 is rotatable relative to lid 23 to a closed position where aperture 25 is misaligned from aperture 27 as shown in FIG. 6. A seal is formed around aperture 27 to allow brew chamber 20 to be pressurized when closure member 24 is in the closed position.

Figure 7:
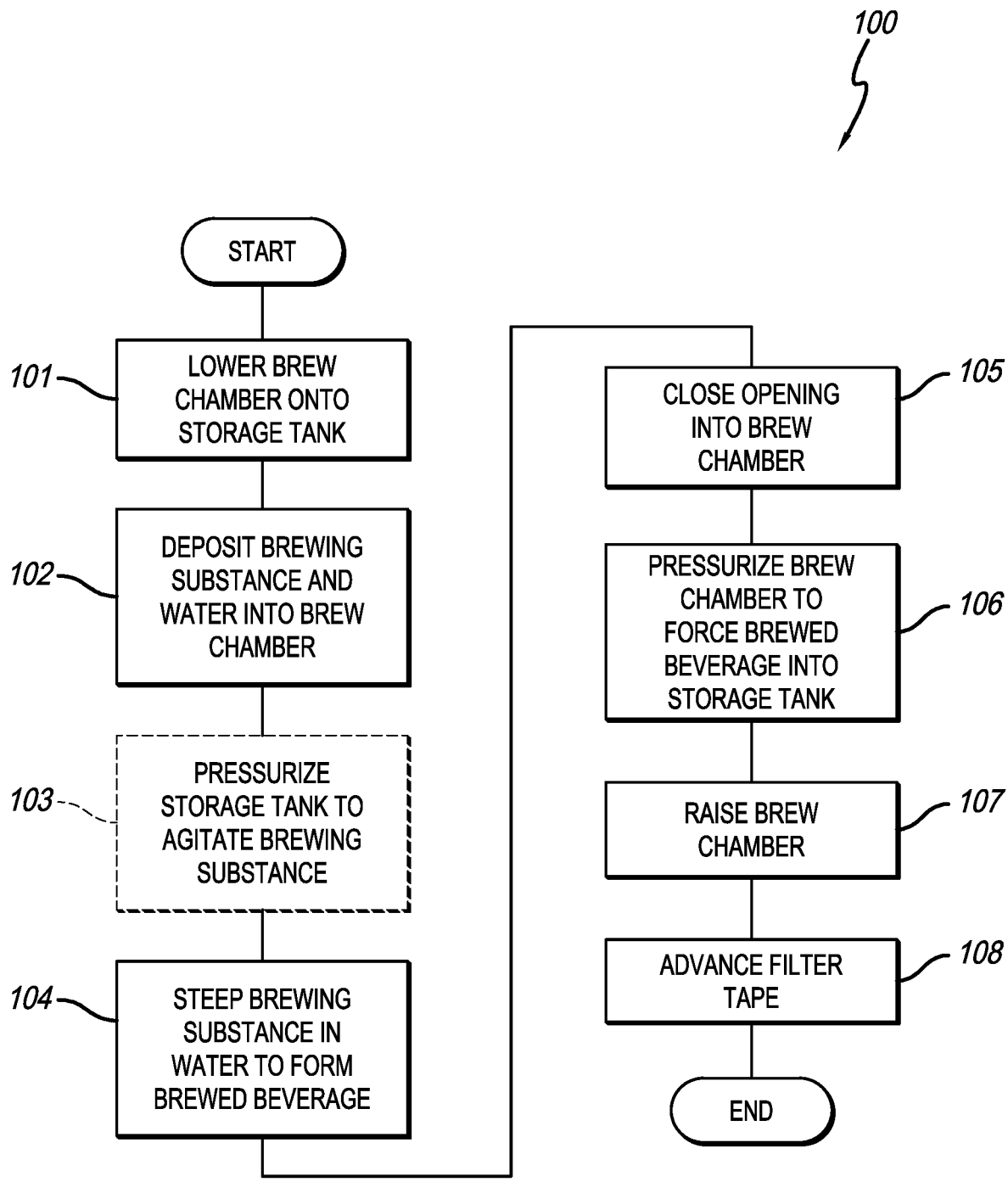
FIG. 7 is a flow chart illustrating one embodiment of a brew process used in the brewer system of FIG. 1.

One embodiment of a process 100 in accordance with the present disclosure for conducting a brew cycle in brewer system 10 is shown in FIG. 7. Process 100 starts at step 101 where brew chamber 20 is lowered onto storage tank 14 over filter tape 16 such as when a user selects a desired beverage to be brewed through user interface 19. In some embodiments, the lowered position is the default position of brew chamber 20. A seal is formed around mouth 15 when brew chamber 20 engages with filter tape 16 and storage tank 14. Brewing substance and water are delivered through apertures 25, 27 into interior region 26 of brew chamber 20 by brewing substance delivery system 11 and water delivery system 13, respectively, at step 102. As discussed above, brewing substance can be pre-ground or ground just prior to delivery to brew chamber 20. Optionally, storage tank 14 can be pressurized by pressure control system 18 to force gas, such as ambient atmosphere (e.g., "air") or an inert gas (e.g., nitrogen), upwardly through the permanent filter element of mouth 15 and through filter tape 16 to cause agitation of the brewing substance and water (sometimes called a slurry). In some embodiments, closure member 24 is in the opened position to allow gas to vent from brew chamber 20 during step 103.

The brewing substance can be allowed to steep with the water for a while to extract desirable characteristics from the brewing substance and form a brewed beverage at step 104 of process 100 as shown in FIG. 7. A predetermined steeping or "dwell" time can be programmed at controller 17 either in the factory or by a user at user interface 19 depending on desired flavor and/or strength of the brewed beverage. Closure member 24 is moved to the closed position at step 105 to seal brew chamber 20, and brew chamber 20 is pressurized by pressure control system 18 to force water and brewed beverage through the brewing substance and filter tape 16 into storage tank 14. Pressurization of brew chamber 20 can be conducted for a predetermined period of time or until a rapid drop in pressure is detected by sensor 41 indicating that a majority of the liquid has been forced out of brew chamber 20. Sensor 41 can also be used to detect a blockage where the pressure in brew chamber 20 rises above a predetermined level. In some embodiments, pressure within storage tank 14 is vented by vent valve 49 during step 106. In the illustrative embodiment, brewed beverage is available for dispensing into cup 92 after step 106.

Brew chamber 20 is raised off of filter tape 16 and storage tank 14 at step 107 of process 100 as shown in FIG. 7. Filter tape 16 is advanced at step 108 to move spent brewing substance 94 to waist bin 96 and to provide a fresh section of filter tape 16 for a subsequent brew cycle. Brewer system 10 resets after step 108 to allow for another brew cycle to be conducted at the selection of a user.

In illustrative embodiments, brewer system 10 is optimized to provide the best, freshest tasting cup of coffee produced. Brewer system 10 is also optimized to minimize the brew cycle time to increase the number of cups of brewed beverage that can be served back-to-back to reduce user wait time.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A brewer system comprising:
   a storage tank formed to define a mouth communicating with the storage tank;
   a filter tape extending over the mouth of the storage tank and movable relative to the storage tank;
   a brew chamber movable relative to the storage tank, the brew chamber configured to retain the filter tape over the mouth and to form a seal around the mouth;
   a brewing substance delivery system configured to dispense brewing substance into the brew chamber;
   a water delivery system configured to deliver water into the brew chamber to mix with the brewing substance and form a brewed beverage;
   a pressure control system coupled to the brew chamber configured to pressurize the storage tank with a gas such that the gas passes through the mouth into the brew chamber to agitate the water and brewing substance during formation of the brewed beverage, wherein the pressure control system is configured to pressurize the brew chamber to force the brewed beverage from the brew chamber through the filter tape and mouth into the storage tank;
   a controller coupled to the brewing substance delivery system, the water delivery system, and the pressure control system, and wherein the controller is configured to operate the brewing substance delivery system, the water delivery system, and the pressure control system at the selection of a user; and
   a sensor coupled to the controller and configured to provide a signal to the controller to shut off the pressure control system when a pressure in the brew chamber drops.

2. The brewer system of claim 1, wherein the brew chamber includes a chamber body and a closure member coupled to the chamber body for rotation relative thereto, and wherein the closure member is configured to rotate between an open position to allow water and brewing substance to enter the brew chamber and a closed position to seal the brew chamber for pressurization.

3. The brewer system of claim 2, further comprising a closure driver coupled to the brew chamber to form a carriage, wherein the closure driver is configured to move the closure member between the opened and closed positions.

4. The brewer system of claim 3, further comprising a carriage driver coupled to the carriage and configured to move the carriage relative to the storage tank.

5. A method of forming a brewed beverage from a brewing substance, the method comprising:
   selectively positioning a filter tape over a mouth of a storage tank, the mouth communicating with the storage tank;
   selectively positioning a brew chamber relative to the storage tank to retain the filter tape over the mouth and form a seal around the mouth of the storage tank;
   selectively delivering water and brewing substance to the brew chamber to form a volume of brewed beverage;
   selectively pressurizing the brew chamber with a pressure control system to force brewed beverage from the brew chamber through the mouth into the storage tank;
   sensing when a pressure in the brew chamber drops; and
   shutting off the pressure control system when the pressure drops.

6. A method of forming a brewed beverage from a brewing substance, the method comprising:
   selectively positioning a filter tape over a mouth of a storage tank, the mouth communicating with the storage tank;
   selectively positioning a brew chamber relative to the storage tank to retain the filter tape over the mouth and form a seal around the mouth of the storage tank;
   selectively delivering water and brewing substance to the brew chamber to form a volume of brewed beverage;
   selectively pressurizing the storage tank with the pressure control system to pass a gas through the mouth into the brew chamber and agitate the water and brewing substance; and
   selectively pressurizing the brew chamber with a pressure control system to force brewed beverage from the brew chamber through the mouth into the storage tank.

7. A method of forming a brewed beverage from a brewing substance, the method comprising:
   selectively positioning a filter tape over a mouth of a storage tank, the mouth communicating with the storage tank;
   selectively positioning a brew chamber relative to the storage tank to retain the filter tape over the mouth and form a seal around the mouth of the storage tank;
   selectively delivering water and brewing substance to the brew chamber to form a volume of brewed beverage;
   selectively pressurizing the brew chamber with a pressure control system to force brewed beverage from the brew chamber through the mouth into the storage tank; and
   selectively venting pressure from the storage tank as the brew chamber is pressurized.

8. A method of forming a brewed beverage from a brewing substance, the method comprising:
   selectively positioning a filter tape over a mouth of a storage tank, the mouth communicating with the storage tank;
   selectively positioning a brew chamber relative to the storage tank to retain the filter tape over the mouth and form a seal around the mouth of the storage tank;
   selectively delivering water and brewing substance to the brew chamber to form a volume of brewed beverage;
   selectively pressurizing the brew chamber with a pressure control system to force brewed beverage from the brew chamber through the mouth into the storage tank; and
   wherein pressurizing the brew chamber includes selectively moving a closure member of the brew chamber from an opened position to a closed position to seal the brew chamber, and selectively passing a gas into the brew chamber to pressurize the brew chamber.

\* \* \* \* \*